(12) United States Patent
Nelson

(10) Patent No.: US 6,378,938 B1
(45) Date of Patent: Apr. 30, 2002

(54) CYCLE SEAT

(76) Inventor: Paul Damian Nelson, 14 Sandhurst Rd., Wantirna, Melbourne (AU), 3152

( * ) Notice: Subject to any disclaimer, the term of this patent is extended or adjusted under 35 U.S.C. 154(b) by 1089 days.

(21) Appl. No.: 08/959,964

(22) Filed: Oct. 24, 1997

Related U.S. Application Data

(63) Continuation of application No. 08/557,052, filed as application No. PCT/AU94/00284 on May 27, 1994, now abandoned.

(30) Foreign Application Priority Data

May 31, 1993 (AU) .............................................. PL9078
Sep. 13, 1993 (AU) .............................................. PM1150

(51) Int. Cl.$^7$ ................................................. B62J 1/00
(52) U.S. Cl. .................................... 297/202; 297/195.1
(58) Field of Search ................................ 297/202, 201, 297/215.1, 195.1, 312

(56) References Cited

U.S. PATENT DOCUMENTS

| | | | | |
|---|---|---|---|---|
| 620,284 A | * | 2/1899 | Cross | .......................... 297/312 |
| 621,140 A | * | 3/1899 | Reuter | .......................... 297/312 |
| 4,108,462 A | | 8/1978 | Martin | |
| 4,176,880 A | * | 12/1979 | Marchello | ............. 297/195.1 X |
| 4,218,090 A | * | 8/1980 | Hoffacker et al. | ....... 297/202 X |
| 4,387,925 A | * | 6/1983 | Barker et al. | ................ 297/201 |
| 4,512,608 A | | 4/1985 | Erani | |
| 4,877,286 A | | 10/1989 | Hobson et al. | |
| 4,909,522 A | * | 3/1990 | Flanigan | ................... 297/215.1 |
| 5,011,222 A | * | 4/1991 | Yates et al. | ............... 297/215.1 |
| 5,348,369 A | * | 9/1994 | Yu | ....................... 297/195.1 X |

FOREIGN PATENT DOCUMENTS

| | | | |
|---|---|---|---|
| AU | 105212 | 8/1937 | |
| AU | 89368 | 10/1983 | |
| AU | 13213 | 12/1983 | |
| AU | 620028 | 10/1988 | |
| DE | 397659 | * 4/1922 | ................. 297/201 |
| DE | 477620 | * 6/1929 | ............. 297/195.1 |
| DE | 3529702 | 3/1987 | |
| DE | 4206501 | * 8/1992 | ................. 297/201 |
| EP | 0043278 | 1/1982 | |
| EP | 0091016 | * 10/1983 | ................. 297/201 |
| EP | 0286559 | * 10/1988 | ............. 297/215.1 |
| GB | 26897 | * 11/1897 | ................. 297/201 |
| GB | 2121740 | 1/1984 | |
| WO | 8700134 | 1/1987 | |
| WO | 9101244 | 2/1991 | |
| WO | 9211175 | 7/1992 | |
| WO | 9311025 | 6/1993 | |

* cited by examiner

*Primary Examiner*—Peter M. Cuomo
*Assistant Examiner*—Stephen Vu
(74) *Attorney, Agent, or Firm*—Price, Heneveld, Cooper, DeWitt & Litton

(57) ABSTRACT

A cycle seat such as a bicycle seat which comprises an abutment section which is inclined with respect to the horizontal. The abutment section is formed from two abutment segments which are connected together. The segments are dimensioned to support the gluteus maximus muscles adjacent the ischial bones so that the majority of the gluteus maximus muscles are not in contact with the seat and wherein the segments do not allow the rider to permanently sit in a vertical position without other support so that the rider is permanently supported in a generally standing position on the bicycle pedals so as to be in a position to deliver substantially maximum pedal power.

16 Claims, 2 Drawing Sheets

CYCLE SEAT

This is a continuation of application Ser. No. 08/557,052 filed on Nov. 30, 1995, which has been abandoned on Oct. 24, 1997 which is a 371 or PCT/AU94/00284 ruled May 27, 1994.

FIELD OF THE INVENTION

This invention relates to a cycle seat and, in particular, but not exclusively, to a bicycle seat for high performance bicycle riding, such as time trialing and other bicycle racing.

BACKGROUND OF THE INVENTION

Conventional bicycle seats generally comprise a horizontal surface on which a rider can sit. Some seats are contoured in shape to provide added support or comfort but generally all seats are arranged such that a rider is intended to sit vertically on the seat so that a rider can pedal the bicycle from such a sitting position. Thus, conventional seats can generally support most of the gluteus maximus muscles whilst the rider is seated on the seat.

Conventional seats are generally triangular in shape and can be provided with depressions on each side to allow movement of the upper legs and give firm crotch and buttock support when the rider is seated. Some seats have a slightly raised back for a buttock chock to help increase pedal thrust but nevertheless, are intended to basically seat the rider vertically on the seat. Some seats are provided with splits to provide independent buttock support with no crotch support at all with a view to providing a more comfortable seat form.

Conventional seats do have a number of drawbacks in that chafing to the inner and upper legs and pressure soreness on the crotch and buttocks can result. Furthermore, since the seats are intended to support the rider's buttocks when the rider is in the seated position, the weight of the rider is taken by the seat through the rider's buttocks and therefore the soft muscle of the gluteus maximus is generally squashed, which can cause fatigue and pressure soreness and also can obstruct free muscle movement and therefore pedalling movement of the rider's legs thereby decreasing efficiency of pedal motion when the rider is seated on the bicycle seat.

Indeed, in order to provide maximum pedal thrust, it is usual for a rider to raise him or herself up from the seat into a generally standing position on the pedals of the bicycle in order to provide maximum pedal power.

SUMMARY OF THE INVENTION

The object of this invention is to provide a seat which overcomes the above problems.

The invention in a first aspect may be said to reside in a cycle seat, including:
- an abutment portion for receiving a portion of a person's anatomy which is adjacent at least one of the person's ischial bones, the abutment portion being dimensioned to receive only the portion of the rider's anatomy adjacent the ischial bone(s) so that the person's soft tissue or muscle substantially outside the ischial bone (s) is not compressed or squeezed when the person is on the seat; and
- support means for supporting the abutment portion so that the abutment portion is transverse with respect to the horizontal so that without other support, it is not possible to permanently sit on the abutment surface with the backbone of the rider arranged generally vertically.

Since the abutment portion supports the muscle or tissue only adjacent the ischial bone(s), the majority of the tissue or muscle is not squashed by the bicycle seat thereby allowing the tissue or muscle and associated tendons and leg muscles to operate to maximum efficiency thereby increasing rider comfort, power delivered and reducing fatigue and soreness.

The invention also provides a cycle seat for a cycle including:
- an abutment surface against which a rider's muscle or tissue can abut, the abutment surface being transverse with respect to the horizontal so that without other support, it is not possible to permanently sit on the abutment surface with the backbone of the rider arranged generally vertically;
- the abutment support being dimensioned to support the muscle or tissue only adjacent the ischial bones such that the majority of the muscle or tissue is not in engagement with the abutment surface; and
- wherein the abutment surface thereby provides a reaction surface for the rider's ischial bones when the rider is pedalling the cycle to thereby provide stability and support for the rider, the rider therefore being supported in a generally standing position on the cycle pedals so as to be in a position to deliver substantially maximum pedal power.

In this aspect of the invention, not only does the seat provide maximum efficiency and increases rider comfort, power delivery and reduces fatigue and soreness, as previously described, but also places the rider in a position where maximum pedal power is always provided without the rider having to raise himself or herself from the seat of the cycle.

In one preferred embodiment of the invention the abutment surface comprises a pair of abutment segments, the abutment segments being of generally rectangular configuration and being coupled together by a coupling member.

Preferably the cycle seat includes a fixture mechanism for fixing the seat to a cycle frame.

Preferably the abutment segments are contoured to generally match the contour of the gluteus maximus muscles adjacent the ischial bones.

Preferably the seat is formed from metal or plastics material and may be padded for additional comfort.

The invention still further provides a cycle seat, including:
- an abutment portion for receiving a portion of a person's anatomy which is adjacent at least one of the persons ischial bones, the abutment portion being dimensioned to receive only the portion of the rider's anatomy adjacent the ischial bone(s) so that the person's soft tissue or muscle substantially outside the ischial bone (s) is not compressed or squeezed when the person is on the seat.

The invention still further provides a cycle seat for a bicycle including:
- an abutment surface against which a rider's muscle or tissue can abut;
- the abutment surface being dimensioned to support the muscle or tissue only adjacent the ischial bones such that the majority of the muscle or tissue is not in engagement with the abutment surface; and
- wherein the abutment surface thereby provides a reaction surface for the rider's ischial bones when the rider is pedalling the cycle to thereby provide stability and support for the rider.

The invention still further provides a cycle seat for a bicycle including:

an abutment surface against which a rider's muscle or tissue can abut, the abutment surface being transverse with respect to the horizontal so that without other support, it is not possible to permanently sit on the abutment surface with the backbone of the rider arranged generally vertically;

the abutment surface being dimensioned to support the muscle or tissue only adjacent the ischial bones such that the majority of the muscle or tissue is not in engagement with the abutment surface; and wherein the abutment surface thereby provides a reaction surface for the rider's ischial bones when the rider is pedalling the cycle to thereby provide stability and support for the rider.

The invention still further provides a cycle seat for a bicycle including:

an abutment surface against which a rider's muscle or tissue can abut, the abutment surface being transverse with respect to the horizontal so that without other support, it is not possible to permanently sit on the abutment surface with the backbone of the rider arranged generally vertically;

the abutment surface being dimensioned to receive only the portion of the rider's anatomy adjacent the ischial bone(s) so the person's soft tissue or muscle substantially outside the ischial bone(s) is not compressed or squeezed when the rider is on the seat; and wherein the abutment surface thereby provides a reaction surface for the rider's ischial bone(s) when the rider is pedalling the cycle to thereby provide stability and support for the rider, and wherein a substantial amount of the rider's weight is taken by the abutment surface.

The invention still further provides a cycle seat for a bicycle including:

an abutment surface against which a rider's muscle or tissue can abut;

the abutment surface being dimensioned to receive only the portion of the rider's anatomy adjacent the ischial bone(s) so the person's soft tissue or muscle substantially outside the ischial bone(s) is not compressed or squeezed when the rider is on the seat; and wherein the abutment surface thereby provides a reaction surface for the rider's ischial bone(s) when the rider is pedalling the cycle to thereby provide stability and support for the rider, the rider therefore being supported in a generally standing position on the cycle pedals so as to be in a position to deliver substantially maximum pedal power.

BRIEF DESCRIPTION OF THE DRAWINGS

A preferred embodiment of the invention will be described, by way of example, with reference to the accompanying drawings in which.

DETAILED DESCRIPTION OF THE PREFERRED EMBODIMENT

Figure 1:
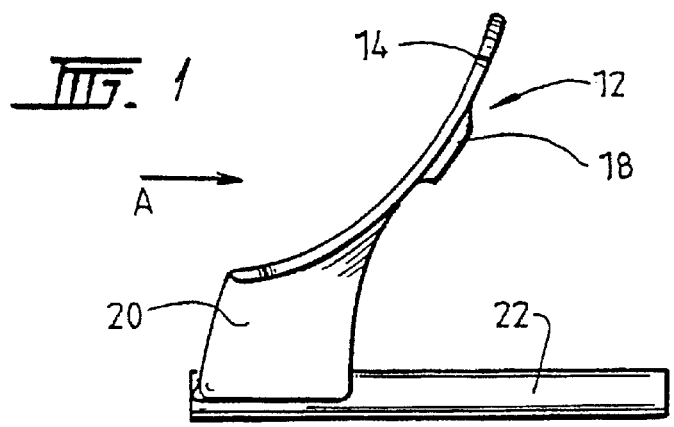
FIG. 1 is a side view of a bicycle seat embodying the invention.
Figure 2:
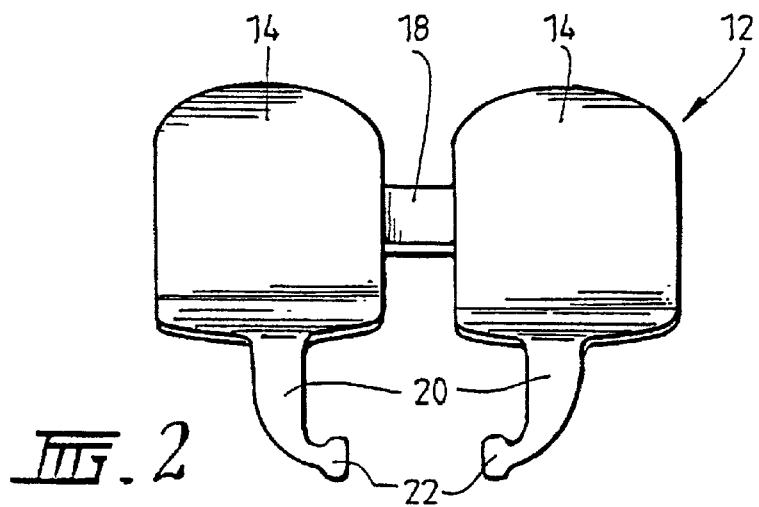
FIG. 2 is a front view of the seat of FIG. 1.
Figure 3:
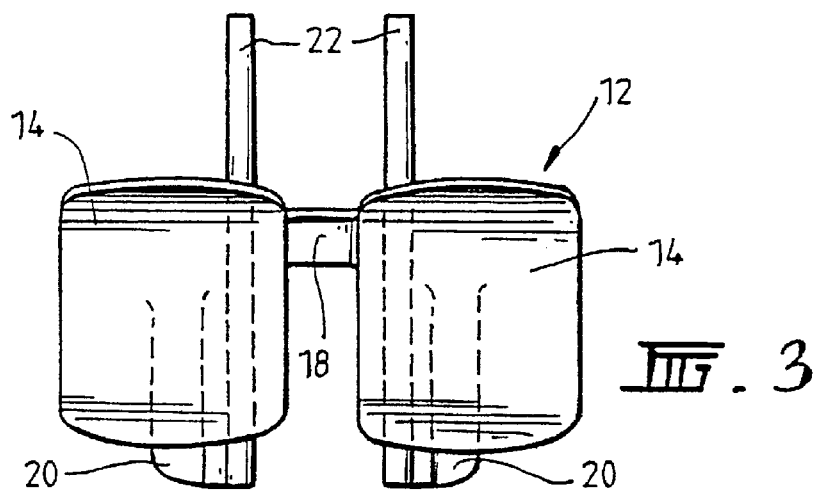
FIG. 3 is a top view of the seat of FIG. 1 and FIG. 2.

With reference to FIGS. 1 to 3, the bicycle seat comprises an abutment surface 12 which is comprised of a pair of abutment segments 14 which are connected together by a connecting bar 18 or by any other suitable device. The segments 14 are therefore spaced apart from one another by a small distance of approximately 10 to 25 millimeters.

As is best shown in FIG. 1, the abutment segments 14 are contoured in shape to provide a generally curved profile which matches the contour of the gluteus maximus muscles adjacent a person's ischial bones. Examples of points of these bones which can be received by the segments 14 include the ischial tuberosity and/or the ramus of the ischium. Thus, the segments 14 are slightly concave from a rider's seating position identified by arrow A in FIG. 1.

Each of the segments 14 is provided with a depending leg 20 which may be integrally formed with the segments 14. The legs 20 support rails 22 which extend rearwardly with respect to the seat and provide a fixture for fixing the seat to a bicycle frame (not shown). Other forms of fixture (not shown) could also be used including cylindrical sleeves for location on a suitable post or pole of the bicycle frame, clamps or the like and bolting arrangements etc.

As is clearly shown in FIG. 1, the segments 14 are inclined with respect to the horizontal to such an extent that it is not possible for a rider to sit on the seat permanently without some other vertical support because the rider will simply slip forward on the seat. Thus, the seat does not allow the rider to permanently sit vertically with the rider's backbone in a generally vertical position and forces the rider to take up a generally standing position on the bicycle with the seat providing a reaction surface for the rider's ischial bones which reacts against pedalling pressure by the rider when the rider's feet are on the pedals of the bicycle.

Figure 4:
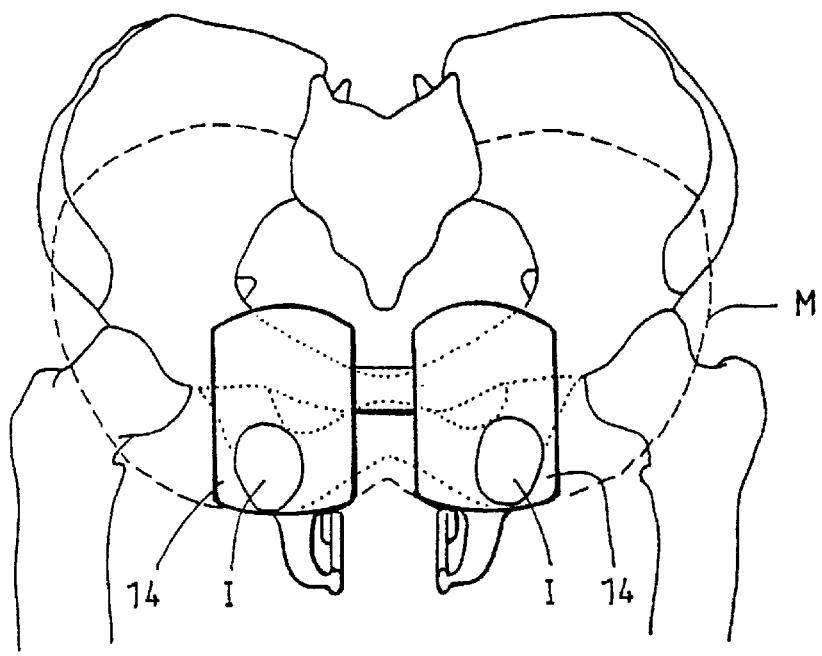
FIG. 4 is a front view similar to FIG. 2 showing a person, in schematic form, seated on the seat.
Figure 5:
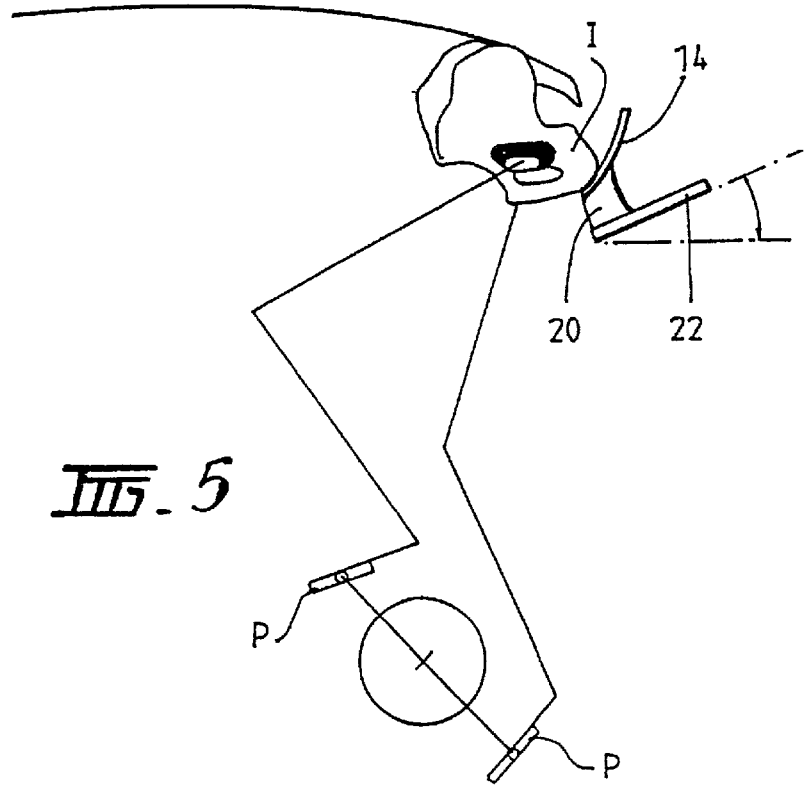
FIG. 5 is a side view similar to FIG. 1 showing a person seated on the seat.

With further reference to FIGS. 4 and 5 and as is best shown in FIG. 4, the segments 14 are dimensioned so as to receive the rider's gluteus maximus muscles M only adjacent the ischial bones I of the rider. Thus, as is identified in FIG. 4, the majority of the gluteus maximus muscles M of the rider are not supported by the segments 14 and are in fact free from the bicycle seat. The gluteus maximus adjacent the ischial bones I are clearly supported by the seat and the seat therefore basically provides a reaction surface for the gluteus maximus muscles adjacent the ischial bones when a rider is seated on the segments and when a rider's feet are on pedals P and pedalling the bicycle. However, depending on how the rider choses to seat himself or herself on the seat, other examples of muscles and their associated tendons which abut the segments 14 may be the adductor magnus, the biceps femoris or the semitendinosus, adjacent the ischial bones.

FIGS. 4 and 5 show how a person is positioned when on the seat. The seat is fixed to a bicycle in any suitable way such as with rails 22 located in a clamp (not shown) with the rails angled upwardly as shown in FIG. 5.

Thus, when a person is seated on the seat as shown in FIGS. 4 and 5 and pedalling the bicycle, the segments 14 provide a reaction surface for supporting the person's ischial bones and stabilizing the person in a generally standing position so that maximum pedalling power can be delivered. Furthermore, since the segments 14 are dimensioned only to accommodate the buttocks adjacent the ischial bones I, the majority of the buttocks are not in contact with the seat and therefore are not squeezed or compressed and are therefore free to work to maximum efficiency. This enables maximum pedal power to be delivered and also overcomes problems associated with soreness, chafing and fatigue.

In other embodiments (not shown) the abutment surface 12 may be formed as a single abutment surface rather than in two abutment segments as in the preferred embodiment of the invention.

The bicycle seat shown in FIG. 1 can be formed from metal or plastics material or any other suitable material and may be padded for additional comfort.

In the preferred embodiment of the invention, the bicycle seat therefore supports the ischial bones and of course the muscle, flesh and tendons between those bones and the bicycle seat. Thus, there is minimal contact with any muscle but maximum contact with force bearing bones. The seat therefore provides good stability to the rider and increases efficiency that force transfers more efficiently via bone than it does via muscle.

In other embodiments only one of the ischial bones could be supported by the surface 12. In this embodiment it is only intended that, for example, one of the segments 14 previously described, be incorporated so that only one side of the body is supported. This embodiment of the invention may have particular application in certain styles of bicycle racing where it is more desired to support one half of the body rather than both sides of the body.

Embodiments of the invention may include one or more extensions or arms (not shown) for receiving the sacrum, protruding area or areas of the ilium or the top of the femur. Specific bone point examples of these bones which may be received by the additional segments (not shown) are, in the case of the sacrum, the sacral tuberosity, lateral sacral crest, median sacral crest or intermediate sacral crest, in the case of the ilium are the iliac crest, posterior superior iliac spine, anterior superior iliac spine or iliac tuberosity, and in the case of the femur the greater trochanter. The additional segments (not shown) is/are dimensioned to receive muscle or tissue only adjacent the above mentioned bones, the muscle or tissue being in the case of the sacrum, the gluteus maximus, the erector spinae or the multifidous; in the case of the ilium, the gluteus maximus, latissimus dorsi, oblique abdominis internus, oblique abdominis externus or erector spinae, and in the case of the femur the gluteus medius. Thus, the majority of those muscles is/are not contacted by the segment(s) and thus is not squeezed or compressed by the segment(s).

In the preferred embodiment described with reference to the accompanying drawings, the seat is arranged in an inclined position such that the rider is placed in a generally full standing position so that substantially none of the weight of the rider is taken by the seat at all. The seat merely provides an abutment for stabilizing the rider and positioning the rider in the standing position so that maximum pedal power can be delivered. In other embodiments, the degree of the incline can be altered from the position shown with reference to the drawings to a smaller incline whereby it is still not possible for a person to permanently sit on the abutment surface with the backbone of the rider arranged generally vertical without some other support for the rider but where when the rider's feet are on the bicycle pedals and hands are on the bicycle handlebars, the rider still is in a standing position but where a substantial amount of the rider's weight is taken by the seat.

The seat may also be arranged in an intermediate position between the position shown with reference to the drawings and the previously mentioned position so that some of the rider's weight is taken by the seat but not a significant amount of the rider's weight. Therefore, some embodiments of the invention may have an adjusting mechanism for adjusting the degree of incline between the position shown with reference to the drawings and the more horizontal position referred to above so that the seat can be positioned according to the rider's ability, fitness or desire.

Depending on which of the above positions is adopted the mechanism (not shown) which fixes the seat to the bicycle can allow back and forth movement in the horizontal direction to suitably locate the seat.

As previously described, the segments 14 are dimensioned so as to support tissue or muscle only adjacent the bone area. However, the segments are preferably of sufficient size so that the rider is able to adjust his or her position relative to the segments very slightly to provide for slight adjustments in position. In the embodiments shown with reference to the drawings, this is achieved by the rider merely adjusting his position upwardly or downwardly with respect to the segments and this will have the affect of moving the rider slightly horizontally back and forth in view of the inclination of the segments 14. Thus, the rider is able to slightly change his or her position and therefore weight distribution by a very small amount during a riding event.

Preferred embodiments of the invention may be formed in slightly difference sizes to suit large, medium and small people. For example, whilst it is intended that the abutment surface only accommodate the bone area of the rider, depending on the size of the person, the size of the segment may be altered and a large person may require a larger abutment surface than a small person. Thus, the bicycle seat could be made in three or more distinct sizes to suit people of differing size.

Embodiments of the invention may also include a lower flat or horizontal portion (not shown) extending outwardly from the inclined segments 14. The flat or horizontal portion and, indeed, the remainder of the seat is still not intended to provide a flat surface on which a person can permanently seat with no other support.

Since modifications within the spirit and scope of the invention may readily be effected by persons skilled within the art, it is to be understood that this invention is not limited to the particular embodiment described by way of example hereinabove.

The claims defining the invention are as follows:

1. A cycle seat for a bicycle comprising:

an inclined surface forming abutment means for receiving a portion of a rider's anatomy which is adjacent to at least one of the rider's ischial bones, the abutment means being dimensioned to receive only the portion of the rider's anatomy adjacent to the ischial bones so that the rider's soft tissue substantially outside the ischial bone(s) is not compressed by the seat when the rider is on the seat; and support means coupled to said abutment means for supporting the abutment means and for coupling the seat to the bicycle so that the abutment means is permanently transverse with respect to the longitudinal axis of the bicycle when the support means couples the seat to the bicycle so that without other supports, it is not possible to permanently sit on the inclined surface with the backbone of the rider arranged generally vertically.

2. The cycle seat of claim 1, wherein the cycle seat includes a fixture mechanism for fixing the seat to a cycle frame.

3. The cycle seat of claim 1 wherein the seat is formed from one of the following group of materials consisting of metal and plastic and may be padded for additional comfort.

4. The cycle seat of claim 1 wherein the abutment portion comprises a pair of abutment segments, the abutment segments being of generally rectangular configuration.

5. A cycle seat for a bicycle comprising:

support means for coupling the seat to a bicycle;

an inclined surface forming an abutment means against which a rider's tissue can abut, the inclined surface being coupled to the support means, the abutment means being permanently transverse with respect to the longitudinal axis of the bicycle when the support means couples the cycle seat to the bicycle so that without other supports, it is not possible to permanently sit on the abutment means with the backbone of the rider arranged generally vertically;

the abutment means being dimensioned to support the tissue only adjacent the ischial bones such that the majority of the tissue is not in engagement with the abutment means; and wherein the abutment means thereby provides a reaction surface for the rider's ischial bones when the rider is pedalling the cycle to thereby provide stability and support for the rider, the rider therefore being supported in a generally standing position on the cycle pedals so as to be in a position to deliver substantially maximum pedal power.

6. The cycle seat of claim 5 wherein the abutment surface comprises a pair of abutment segments, the abutment segments being of generally rectangular configuration and being coupled together by a coupling member.

7. The cycle seat of claim 6 wherein the abutment segments are contoured to generally match the contour of the gluteus maximus muscles adjacent the ischial bones.

8. The cycle seat of claim 6 wherein the segments are substantially rectangular in configuration and are spaced apart by a distance of from 10 to 25 millimeters.

9. The cycle seat of claim 2 wherein the cycle seat includes a fixture mechanism for fixing the seat to a cycle frame.

10. The cycle seat of claim 2 wherein the seat is formed from one of the following group of materials consisting of metal and plastic and may be padded for additional comfort.

11. A cycle seat for a bicycle comprising:

support means for coupling the seat to a bicycle;

an inclined surface forming abutment means against which a rider's tissue can abut, the inclined surface being coupled to the support means, the abutment means being permanently transverse with respect to the longitudinal axis of the bicycle when the support means couples the seat to the bicycle so that without other supports, it is not possible to permanently sit on the abutment means with the backbone of the rider arranged generally vertically;

the abutment means being dimensioned to receive only the portion of the rider's anatomy adjacent to the ischial bones so the rider's soft tissue substantially outside the ischial bones is not compressed by the seat when the rider is on the seat; and wherein the abutment means thereby provides a reaction surface for the rider's ischial bones when the rider is pedalling the cycle to thereby provide stability and support for the rider.

12. A cycle seat for a bicycle comprising:

an inclined surface forming abutment means for receiving substantially only that portion of a person's seating anatomy which covers at least a part of one of the person's ischial bones thereof, the abutment means being dimensioned so that the majority of the person's seating anatomy is off said abutment means so that substantially all the soft tissue surrounding said portion of the person's seating anatomy is not compressed by the seat when the person is on the seat; and support means coupled to said abutment means for supporting the abutment means and for coupling the abutment means to the bicycle so that the abutment means is permanently transverse with respect to the longitudinal axis of the bicycle when the support means couples the seat to the bicycle so that without other supports, it is not possible to permanently sit on the abutment means with the backbone of the person arranged generally vertically.

13. A cycle seat for a bicycle comprising:

an inclined surface forming abutment means intended for receiving a portion of a person's seating anatomy which covers at least a part of one of the person's ischial bones thereof, the abutment means being dimensioned so that the majority of the seating compression to the person's seating anatomy occurs between the ischial bones and said abutment means and so that substantially all the soft tissue surrounding said portion of the person's seating anatomy is not compressed or squeezed by the seat when the person is on the seat; and support means coupled to said abutment means for supporting the abutment means and coupling the abutment means to the bicycle so that the abutment means is permanently transverse with respect to the longitudinal axis of the bicycle when the support means couples the seat to the bicycle so that without other supports, it is not possible to permanently sit on the abutment means with the backbone of the rider arranged generally vertically.

14. A cycle seat for a bicycle comprising:

an inclined surface portion forming abutment means intended for receiving a portion of a person's seating anatomy which covers at least a part one of the person's ischial bones thereof, the abutment means being dimensioned so that the majority of the person's seating anatomy is off said abutment means and so that substantially all the soft tissue surrounding said portion of the person's seating anatomy is not compressed by the seat when the person is on the seat; and support means coupled to said abutment means for supporting the abutment means and coupling the abutment means to the so that the abutment means is permanently transverse with respect to the longitudinal axis of the bicycle when the support means couples the seat to the bicycle so that without other supports, it is not possible to permanently sit on the abutment means with the backbone of the rider arranged generally vertically.

15. A method for using a bicycle seat including an abutment surface supported on a bicycle by a support structure, the abutment surface being dimensioned to receive only the portion of a rider's anatomy adjacent to the ischial bones, said method comprising the step of permanently positioning the abutment surface transverse with respect to the longitudinal axis of the bicycle when the support structure couples the seat to the bicycle so that without other supports, it is not possible for a rider to permanently sit on the abutment surface with the backbone of the rider arranged vertically, whereby the abutment surface provides a reaction surface for the rider's ischial bones when the rider is pedalling the bicycle to thereby provide stability and support for the rider.

16. A cycle seat comprising:

an inclined surface forming abutment means for receiving only the portion of the rider's anatomy adjacent to the ischial bones and for maintaining the rider's soft tissue substantially outside the ischial bones substantially non-compressed by the seat when the rider is on the seat; and support means coupled to said abutment means for supporting the abutment means and coupling the abutment means to the bicycle so that the abutment means is transverse with respect to the longitudinal axis of the bicycle when the support means couples the seat to the bicycle during riding so that without other supports, it is not possible to permanently sit on the inclined surface with the backbone of the rider arranged generally vertically.

* * * * *

UNITED STATES PATENT AND TRADEMARK OFFICE
CERTIFICATE OF CORRECTION

PATENT NO.    : 6,378,938 B1
DATED         : April 30, 2002
INVENTOR(S)   : Paul D. Nelson It is certified that error appears in the above-identified patent and that said Letters Patent is hereby corrected as shown below:

Column 5,
Line 10, after "efficiency" insert -- in --.

Signed and Sealed this

Eighteenth Day of February, 2003

JAMES E. ROGAN
*Director of the United States Patent and Trademark Office*